(12) United States Patent
Guo et al.

(10) Patent No.: US 9,979,114 B2
(45) Date of Patent: May 22, 2018

(54) CONNECTOR, SOCKET, METHOD FOR PROVIDING SIGNALS TO CONNECTOR BY SOCKET, ELECTRONIC EQUIPMENT

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Guo, Beijing (CN); Zhiyong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days. days.

(21) Appl. No.: 15/543,556

(22) PCT Filed: Nov. 11, 2016

(86) PCT No.: PCT/CN2016/105412
§ 371 (c)(1),
(2) Date: Jul. 13, 2017

(87) PCT Pub. No.: WO2017/128810
PCT Pub. Date: Aug. 3, 2017

(65) Prior Publication Data
US 2018/0069338 A1  Mar. 8, 2018

(30) Foreign Application Priority Data

Jan. 27, 2016  (CN) .......................... 2016 1 0054177

(51) Int. Cl.
*H01R 27/00* (2006.01)
*H01R 13/40* (2006.01)
(Continued)

(52) U.S. Cl.
CPC ......... *H01R 13/40* (2013.01); *G06F 13/4068* (2013.01); *H01R 13/025* (2013.01);
(Continued)

(58) Field of Classification Search
CPC .............. H01R 2107/00; H01R 13/025; H01R 13/642; H01R 13/66; H01R 24/28; H01R 24/62; G06F 13/4068; H02H 11/002
(Continued)

(56) References Cited

U.S. PATENT DOCUMENTS 5,111,497 A * 5/1992 Bliven ................. H01R 13/443
361/679.32
5,501,608 A * 3/1996 Scheer ................... H01R 31/06
439/218

(Continued)

FOREIGN PATENT DOCUMENTS

| CN | 102904241 A | 1/2013 |
| CN | 103187642 A | 7/2013 |

(Continued)

OTHER PUBLICATIONS

International Search Report and Written Opinion in PCT/CN2016/105412 dated Feb. 15, 2017, with English translation.

(Continued)

*Primary Examiner* — Abdullah Riyami
*Assistant Examiner* — Vladimir Imas
(74) *Attorney, Agent, or Firm* — Womble Bond Dickinson (US) LLP

(57) ABSTRACT

The embodiments of the invention provide a connector, a socket, a method for providing signals to a connector by a socket and an electronic equipment. The connector includes a main body. The main body has a 180° rotationally symmetrical shape with respect to an axis of the main body. The axis of the main body is parallel to an insertion direction.

(Continued)

Two detection contacts and several signal contacts are arranged on a surface of the main body. The two detection contacts are respectively arranged at positions symmetrical with respect to the axis of the main body. A diode is electrically connected between the two detection contacts. The orientation of the connector can be easily and accurately detected by a diode electrically connected between the two detection contacts.

20 Claims, 5 Drawing Sheets

(51) Int. Cl.
| | |
|---|---|
| H01R 13/642 | (2006.01) |
| H01R 13/66 | (2006.01) |
| H01R 13/02 | (2006.01) |
| H01R 24/62 | (2011.01) |
| H02H 11/00 | (2006.01) |
| G06F 13/40 | (2006.01) |
| H01R 24/28 | (2011.01) |
| H01R 107/00 | (2006.01) |

(52) U.S. Cl.
CPC ........... *H01R 13/642* (2013.01); *H01R 13/66* (2013.01); *H01R 24/28* (2013.01); *H01R 24/62* (2013.01); *H02H 11/002* (2013.01); *H01R 2107/00* (2013.01)

(58) Field of Classification Search
USPC ....... 439/218, 660, 489, 955, 620.21–620.23
See application file for complete search history.

(56) References Cited

U.S. PATENT DOCUMENTS

| | | | | |
|---|---|---|---|---|
| 7,104,848 B1* | 9/2006 | Chou | ............... | G06K 19/07732 439/660 |
| 7,314,392 B2* | 1/2008 | Pharn | ................... | H01R 13/641 439/489 |
| 7,811,119 B2* | 10/2010 | Caveney | ................ | H04Q 1/136 439/489 |
| 7,828,569 B2* | 11/2010 | Aronson | ................ | H01R 24/64 439/218 |
| 7,872,873 B2* | 1/2011 | Hiew | .................... | G06F 1/1632 361/715 |
| 7,980,888 B1* | 7/2011 | Fukushima | ........ | H01R 13/6683 439/489 |
| 8,102,657 B2* | 1/2012 | Hiew | .................... | G06F 1/1632 361/737 |
| 8,264,366 B2* | 9/2012 | Chamarti | ............... | G01D 21/00 340/10.42 |
| 8,542,472 B2* | 9/2013 | Mullins | .................. | H01R 24/60 361/86 |
| 8,724,281 B2* | 5/2014 | Mullins | ................ | H01R 13/641 361/93.9 |
| 8,784,123 B1* | 7/2014 | Leiba | ..................... | H01R 27/00 439/218 |
| 8,891,216 B2* | 11/2014 | Mullins | .................. | H04M 3/08 361/58 |
| 8,998,620 B2* | 4/2015 | Ni | .......................... | H01R 12/71 361/737 |
| 9,142,926 B2* | 9/2015 | Tsai | ...................... | H01R 24/60 |
| 9,215,521 B2* | 12/2015 | Lee | ....................... | H01R 13/66 |
| 9,543,694 B2* | 1/2017 | Tagawa | ................. | H01R 13/62 |
| 2013/0029527 A1 | 1/2013 | Mullins | | |
| 2017/0358891 A1* | 12/2017 | Peng | .................. | H01R 13/6691 |

FOREIGN PATENT DOCUMENTS

| | | |
|---|---|---|
| CN | 103209917 A | 7/2013 |
| CN | 103972729 A | 8/2014 |
| CN | 203871510 U | 10/2014 |
| CN | 204012075 U | 12/2014 |
| CN | 104408007 A | 3/2015 |
| CN | 204809784 U | 11/2015 |
| CN | 105514657 A | 4/2016 |
| CN | 205355480 U | 6/2016 |

OTHER PUBLICATIONS

Office Action in Chinese Application No. 201610054177.9 dated Aug. 23, 2017, with English translation.

* cited by examiner

CONNECTOR, SOCKET, METHOD FOR PROVIDING SIGNALS TO CONNECTOR BY SOCKET, ELECTRONIC EQUIPMENT

RELATED APPLICATIONS

The present application is the U.S. national phase entry of the international application PCT/CN2016/105412, with an international filing date of Nov. 11, 2016, which claims the benefit of Chinese Patent Application No. 201610054177.9, filed on Jan. 27, 2016, the entire disclosures of which are incorporated herein by reference

TECHNICAL FIELD

The present invention relates to the field of electrical engineering, in particular to a connector, a socket, a method for providing signals to a connector by a socket and an electronic equipment.

BACKGROUND

The liquid crystal display device and the mobile phone system are connected by a connector. In the lighting inspection/cell phone assembly process, due to the inadequate education of operating, careless operator, or the connector not clearly identified, reverse insertion of the connector is apt to occur. If estimated only based on the appearance, many connectors (especially the crimp connector) in the state of reverse insertion are basically same to those in the state of regular insertion. Power up operation in the state of reverse insertion may cause a signal loading error, which can easily cause circuit burnout.

Similarly, in other areas of electrical engineering, the reverse insertion of the connector can also cause signal loading errors, producing a great harm to the circuit system.

SUMMARY

To this end, it is desired to provide a connector, a socket and a connection method capable of being inserted in two opposite orientations and ensuring that the correct signals are applied to the contacts.

An embodiment of the invention provides a connector. The connector includes a main body. The main body has a 180° rotationally symmetrical shape with respect to an axis of the main body. The axis of the main body is parallel to an insertion direction. Two detection contacts and several signal contacts are arranged on a surface of the main body. The two detection contacts are respectively arranged at positions symmetrical with respect to the axis of the main body. A diode is electrically connected between the two detection contacts.

The orientation of the connector can be easily and accurately detected by a diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Optionally, the several signal contacts includes a first group of signal contacts arranged with a first spatial distribution and a second group of signal contacts arranged with a second spatial distribution. The first spatial distribution and the second spatial distribution are symmetrical with respect to the axis of the main body and form several pairs of signal contacts. Two signal contacts in each pair of signal contacts are symmetrical with respect to the axis of the main body.

The signal contacts are arranged at symmetrical positions to facilitate direct "rotation" for the spatial positions of the electrical signals corresponding to the respective signal contacts, thereby achieving a more general design.

Optionally, the first group of signal contacts and one of the two detection contacts are arranged together in a linear array.

This arrangement corresponds to conventional connectors (such as crimp connectors) and is suitable for a wide variety of conventional circuit interfaces.

Optionally, the main body has a shape of cuboid. The first group of signal contacts and the second groups of signal contacts are arranged on two opposite surfaces of the cuboid. The two opposite surfaces are parallel to the axis of the main body.

This arrangement provides a general interface design, which is suitable for conventional device connections.

Optionally, a shape of the detection contact and the signal contact is a strip shape or a dot shape.

With the above mentioned arrangement, a flexible design size and connection can be achieved.

An embodiment of the invention further provides a socket adapted to accommodate the connector according to the above mentioned embodiments. The socket includes a groove having a 180° rotationally symmetrical shape with respect to an axis of the groove. The axis of the groove is parallel to an insertion direction. Two socket detection contacts and several socket signal contacts are arranged on a surface of the groove. The positions of two socket detection contacts respectively correspond to the positions of said two detection contacts. The positions of the several socket signal contacts respectively correspond to the positions of the several signal contacts, thereby forming several pairs of socket signal contacts. Two socket signal contacts in each pair of socket signal contacts are symmetrical with respect to the axis of the groove. One of the socket detection contacts is used for outputting an orientation identification signal and the other of the socket detection contacts is used for detecting the orientation identification signal.

With the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Optionally, the orientation identification signal is a voltage signal or a current signal.

The type of the orientation identification signal can be set based on the specific circuit type and the operating principle of the circuit system.

Optionally, the socket further includes an orientation detection circuit for detecting a conductive direction of the two detection contacts to determine an orientation of the connector.

The socket with the directional detection circuit can be directly connected to an existing general circuit system without modifying the existing general circuit system.

Optionally, the socket further includes several signal regulating circuits. Each signal regulating circuit includes: a pair of signal input terminals, a signal interchange unit electrically connected to the pair of signal input terminals, and a pair of signal output terminals electrically connected to the signal interchange unit. The two signal output terminals in each pair of signal output terminals are respectively electrically connected to two socket signal contacts in a pair of socket signal contacts.

When the connector is in a first orientation, each pair of signal output terminals provide a pair of predetermined signals to the two socket signal contacts in the corresponding pair of socket signal contacts.

When the connector is in a second orientation opposite to the first orientation, each pair of signal output terminals provide a pair of interchanged predetermined signals to the two socket signal contacts in the corresponding pair of socket signal contacts.

With the above mentioned arrangement, the socket signal contacts in the socket can provide the correct electrical signals to the respective signal contacts of the connector regardless of whether the connector is inserted into the socket in the first orientation or in the second orientation opposite to the first orientation.

Optionally, the signal interchange unit determines whether to interchange signals on the two signal output terminals based on the orientation of the connector.

By means of the orientation of the connector, it is possible to accurately indicate the respective signal contacts of the connector and determine the signals to be applied to the respective signal contacts.

Optionally, the signal interchange unit includes a first orientation input terminal, a second orientation input terminal, a first CMOS transmission gate, a second CMOS transmission gate, a third CMOS transmission gate and a fourth CMOS transmission gate. The first orientation input terminal and the second orientation input terminal provide a pair of mutually inverted signals. Each CMOS transmission gate includes a first gate and a second gate having different polarities. The first orientation input terminal is electrically connected to a second gate of the first CMOS transmission gate, a first gate of the second CMOS transmission gate, a second gate of the third CMOS transmission gate and a first gate of the fourth CMOS transmission gate. The second orientation input terminal is electrically connected to a first gate of the first CMOS transmission gate, a second gate of the second CMOS transmission gate, a first gate of the third CMOS transmission gate and a second gate of the fourth CMOS transmission gate. An input terminal of the first CMOS transmission gate and an input terminal of the fourth CMOS transmission gate are electrically connected to a signal input terminal of the pair of signal input terminals. An input terminal of the second CMOS transmission gate and an input terminal of the third CMOS transmission gate are electrically connected to another signal input terminal of the pair of signal input terminals. An output terminal of the first CMOS transmission gate and an output terminal of the second CMOS transmission gate are electrically connected to a signal output terminal of the pair of signal output terminals. An output terminal of the third CMOS transmission gate and an output terminal of the fourth CMOS transmission gate are electrically connected to another signal output terminal of the pair of signal output terminals.

The signal interchange unit can be created in the form of a plurality of CMOS transmission gates, and it is capable of transmitting digital signals and/or analog signals at a high rate and avoiding voltage loss. Similarly, the signal interchange unit can be implemented using a plurality of transistors.

An embodiment of the invention further provides a method for providing signals to the connector according to the above mentioned embodiments by the socket according to the above mentioned embodiments of the present invention. The method includes: determining an orientation of the connector, and respectively providing signals to the several socket signal contacts based on the orientation of the connector.

The orientation of the connector can be easily and accurately detected by the diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Optionally, the step of determining an orientation of the connector includes: detecting a conductive direction of the two detection contacts to determine an orientation of the connector.

The orientation of the connector can be determined directly and quickly based on the conductive direction of the two detection contacts.

Optionally, the step of respectively providing signals to the several socket signal contacts based on the orientation of the connector includes: when the connector is in a first orientation, providing a pair of predetermined signals to the two socket signal contacts in the corresponding pair of socket signal contacts; when the connector is in a second orientation opposite to the first orientation, providing a pair of interchanged predetermined signals to the two socket signal contacts in the corresponding pair of socket signal contacts.

With the above mentioned arrangement, the socket signal contacts in the socket can provide the correct electrical signals to the respective signal contacts of the connector regardless of whether the connector is inserted into the socket in the first orientation or in the second orientation opposite to the first orientation.

An embodiment of the invention further provides an electronic equipment. The electronic equipment includes the connector according to the above mentioned embodiments and/or the socket according to the above mentioned embodiments of the present invention.

The orientation of the connector can be easily and accurately detected by the diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

BRIEF DESCRIPTION OF THE DRAWINGS

In order to more clearly illustrate the technical solutions in embodiments of the invention or in the prior art, the appended drawings needed to be used in the description of the embodiments or the prior art will be introduced briefly in the following. Obviously, the drawings in the following description are only some embodiments of the invention, and for those of ordinary skills in the art, other drawings may be obtained according to these drawings under the premise of not paying out creative work.

DETAILED DESCRIPTION OF THE INVENTION

In the following, the technical solutions in the embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1:
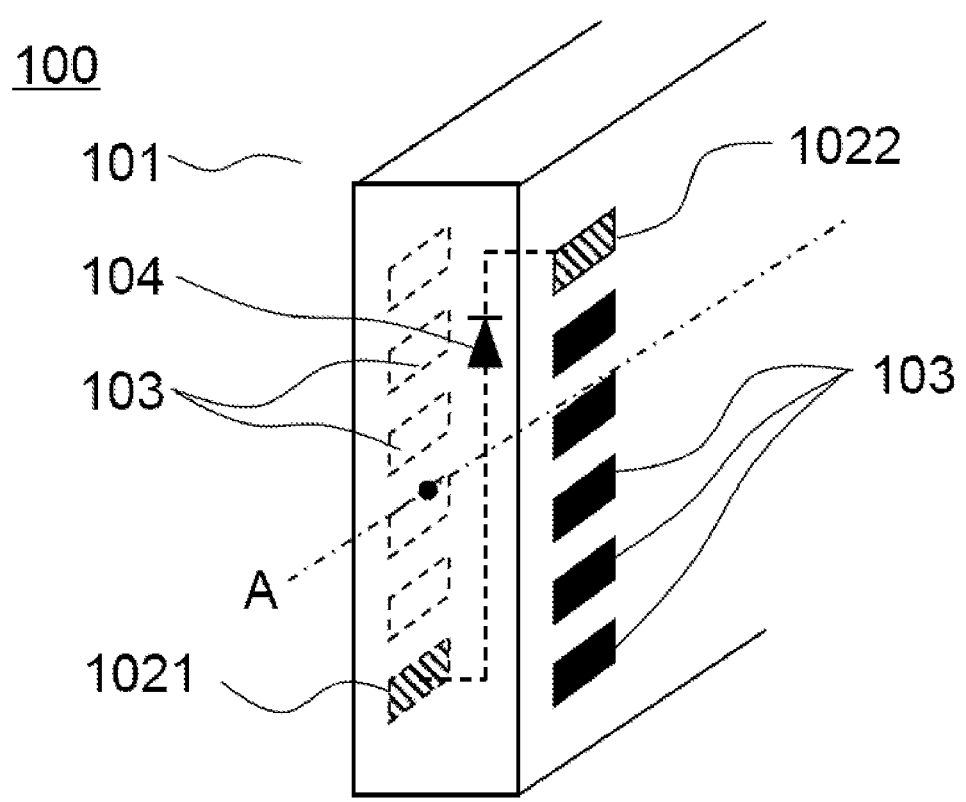
FIG. 1 is a schematic diagram of a connector according to an embodiment of the invention.

As shown in FIG. 1, an embodiment of the invention provides a connector 100. The connector 100 includes a main body 101. The main body 101 has a 180° rotationally symmetrical shape with respect to an axis A of the main body. The axis A of the main body is parallel to an insertion direction. Two detection contacts 1021, 1022 and several signal contacts 103 are arranged on a surface of the main body 101. The two detection contacts 1021, 1022 are respectively arranged at positions symmetrical with respect to the axis A of the main body. A diode 104 is electrically connected between the two detection contacts 1021, 1022.

The orientation of the connector can be easily and accurately detected by a diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Figure 2A:
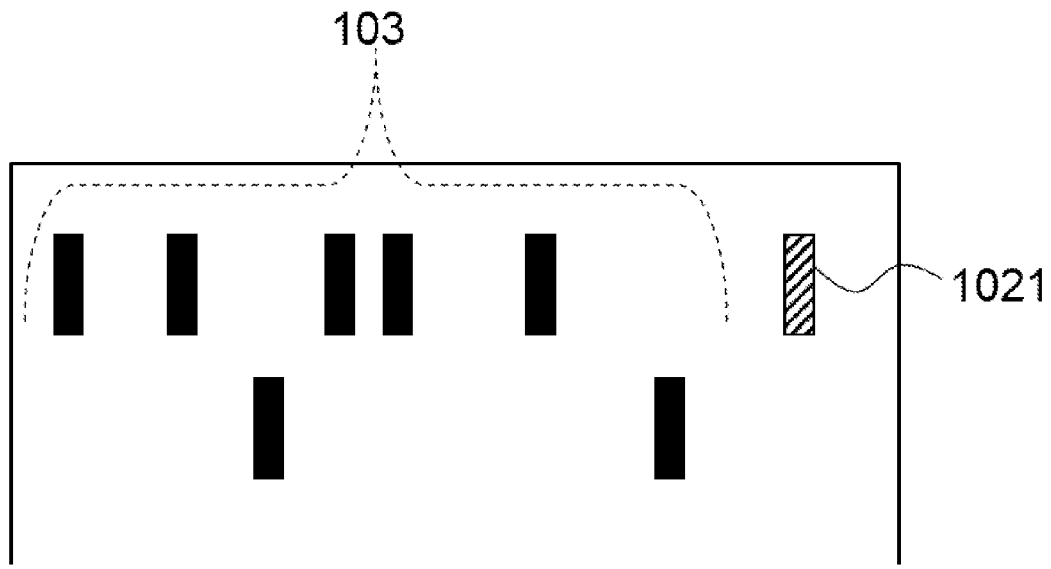
FIG. 2a and FIG. 2b are schematic diagrams of distribution for signal contacts on the connector according to an embodiment of the invention.
Figure 2B:
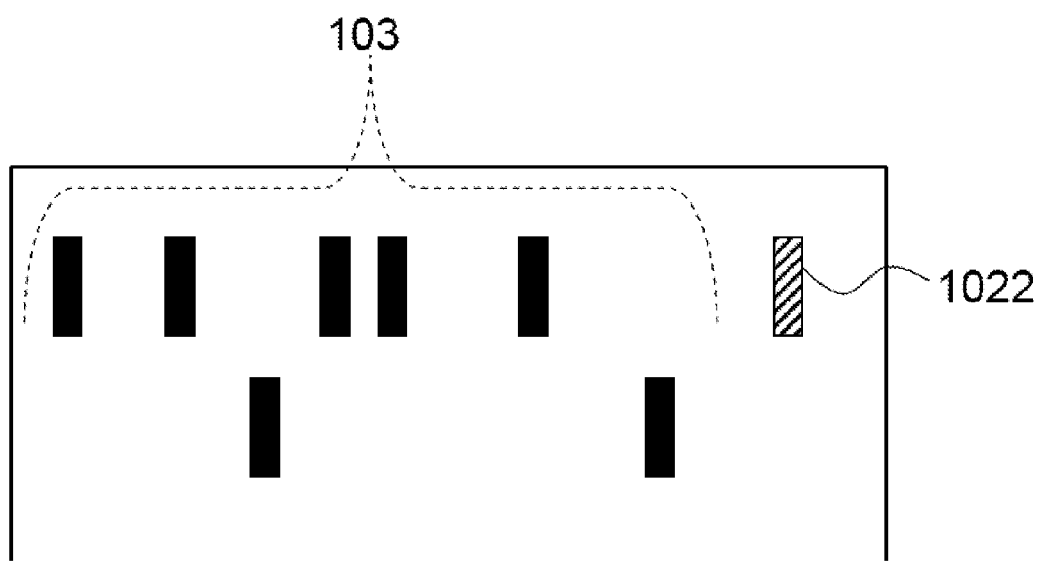

Optionally, the several signal contacts 103 includes a first group of signal contacts 103 arranged with a first spatial distribution (as shown in FIG. 2a) and a second group of signal contacts 103 arranged with a second spatial distribution (as shown in FIG. 2b). The second group of signal contacts 103 are arranged on a lateral surface opposite to the first group of signal contacts 103. The first spatial distribution and the second spatial distribution are symmetrical with respect to the axis of the main body and form several pairs of signal contacts. Two signal contacts in each pair of signal contacts are symmetrical with respect to the axis of the main body.

The signal contacts are arranged at symmetrical positions to facilitate direct "rotation" for the spatial positions of the electrical signals corresponding to the respective signal contacts, thereby achieving a more general design.

Though the two detection contacts 1021, 1022 and signal contacts 103 are arranged on two opposite lateral surfaces in the drawings, it will be understood by those skilled in the art that the two detection contacts 1021, 1022 and the signal contacts 103 can also be distributed on other lateral surfaces and the end surface in other styles as long as they meet the "symmetrical" requirement described above.

Figure 3:
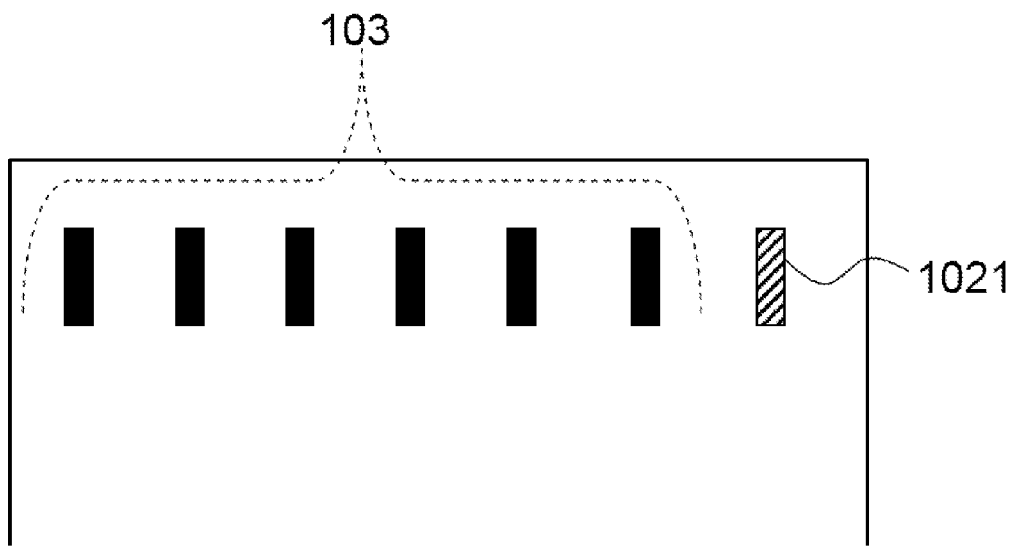
FIG. 3 is a schematic diagram of distribution for signal contacts on the connector according to another embodiment of the invention.
Figure 4:
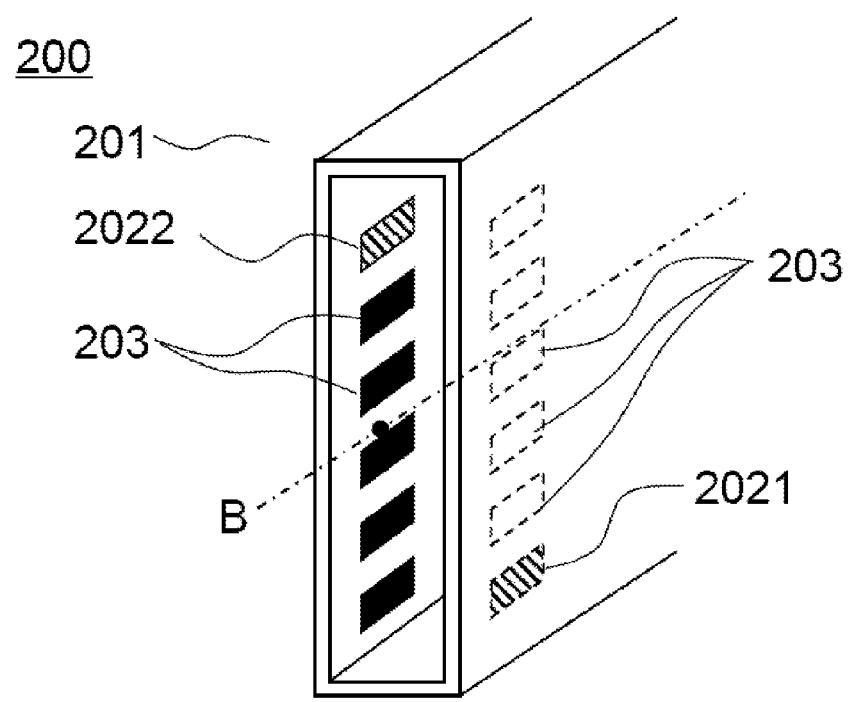
FIG. 4 is a schematic diagram of a socket according to an embodiment of the invention.

Optionally, as shown in FIG. 3, the first group of signal contacts 103 and one of the two detection contacts 1021 are arranged together in a linear array.

This arrangement corresponds to conventional connectors (such as crimp connectors) and is suitable for a wide variety of conventional circuit interfaces.

Optionally, as shown in FIG. 1, the main body 101 has a shape of cuboid. The first group of signal contacts 103 and the second groups of signal contacts 103 are arranged on two opposite surfaces of the cuboid. The two opposite surfaces are parallel to the axis A of the main body.

This arrangement provides a general interface design, which is suitable for conventional device connections.

Optionally, a shape of the detection contact and the signal contact is a strip shape or a dot shape.

With the above mentioned arrangement, a flexible design size and connection can be achieved.

An embodiment of the invention further provides a socket 200 adapted to accommodate the connector 100 according to the above mentioned embodiments. The socket 200 includes a groove 201 having a 180° rotationally symmetrical shape with respect to an axis B of the groove. The axis B of the groove is parallel to an insertion direction. Two socket detection contacts 2021, 2022 and several socket signal contacts 203 are arranged on a surface of the groove 201. The positions of two socket detection contacts 2021, 2022 respectively correspond to the positions of said two detection contacts 1021, 1022. The positions of the several socket signal contacts 203 respectively correspond to the positions of the several signal contacts 103, thereby forming several pairs of socket signal contacts. Two socket signal contacts in each pair of socket signal contacts are symmetrical with respect to the axis B of the groove. One of the socket detection contacts 2021 is used for outputting an orientation identification signal and the other of the socket detection contacts 2022 is used for detecting the orientation identification signal.

With the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Optionally, the orientation identification signal is a voltage signal or a current signal.

The type of the orientation identification signal can be set based on the specific circuit type and the operating principle of the circuit system.

Optionally, the socket further includes an orientation detection circuit (not shown). The orientation detection circuit is used for detecting a conductive direction of the two detection contacts to determine an orientation of the connector.

The socket with the directional detection circuit can be directly connected to an existing general circuit system without modifying the existing general circuit system.

Figure 5:
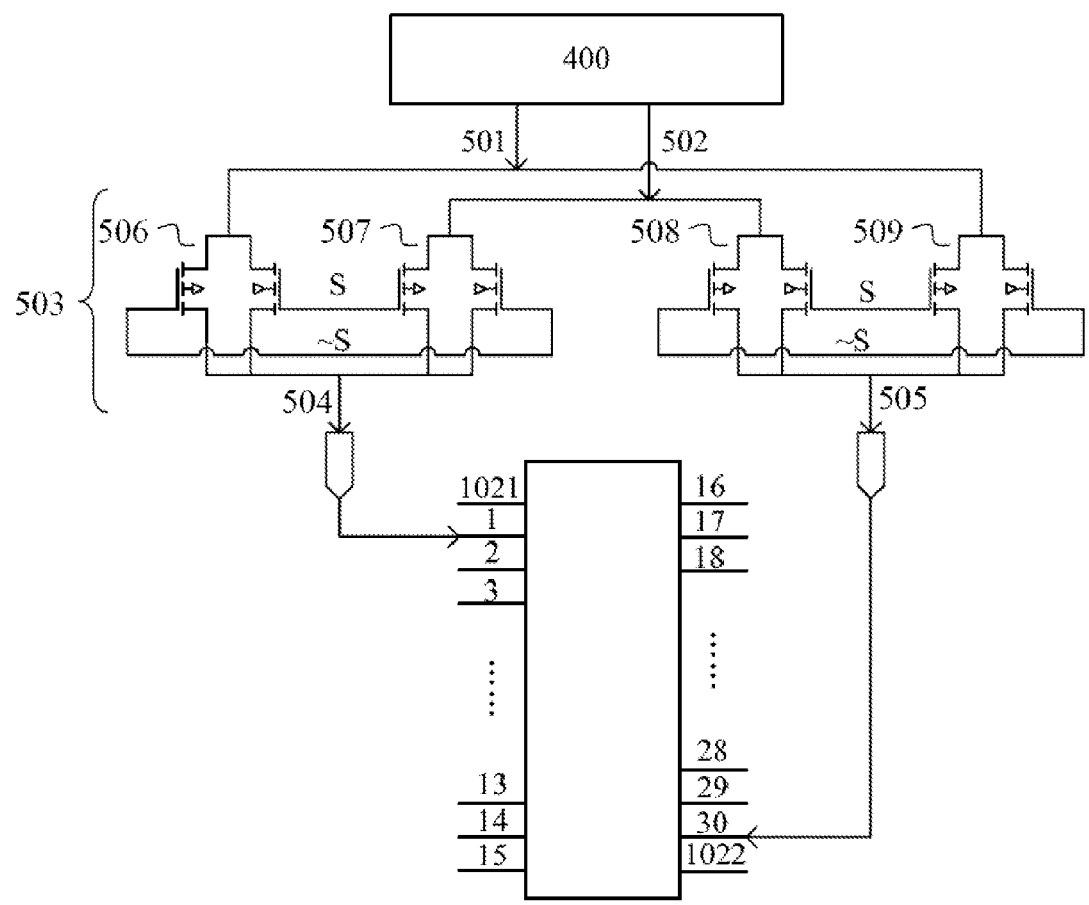
FIG. 5 is a schematic diagram of a signal interchange unit according to an embodiment of the invention.

Optionally, as shown in FIG. 5, the socket further includes several signal regulating circuits. Each signal regulating circuit includes: a pair of signal input terminals 501, 502, a signal interchange unit 503 electrically connected to the pair of signal input terminals 501, 502, and a pair of signal output terminals 504, 505 electrically connected to the signal interchange unit 503. The two signal output terminals 504, 505 in each pair of signal output terminals 504, 505 are respectively electrically connected to two socket signal contacts 1, 30 in a pair of socket signal contacts.

When the connector is in a first orientation, each pair of signal output terminals provide a pair of predetermined signals to the two socket signal contacts 203 in the corresponding pair of socket signal contacts.

When the connector is in a second orientation opposite to the first orientation, each pair of signal output terminals provide a pair of interchanged predetermined signals to the two socket signal contacts 203 in the corresponding pair of socket signal contacts.

The signal circuit 400 provides signals for the socket signal contacts 1, 30 to the pair of signal input terminals 501, 502 respectively. The configuration and principle of the signal circuit 400 are the same as those of the existing signal circuit and therefore are not repeated herein. Moreover, though 30 socket signal contacts are shown in the form of an example in FIG. 5, those skilled in the art will understand that the number of the socket signal contacts (and the number of the signal contacts on the connector) can also be set as desired.

With the above mentioned arrangement, the socket signal contacts in the socket can provide the correct electrical signals to the respective signal contacts of the connector regardless of whether the connector is inserted into the socket in the first orientation or in the second orientation opposite to the first orientation.

Optionally, the signal interchange unit determines whether to interchange signals on the two signal output terminals based on the orientation of the connector.

By means of the orientation of the connector, it is possible to accurately indicate the respective signal contacts of the connector and determine the signals to be applied to the respective signal contacts.

Optionally, as shown in FIG. 5, the signal interchange unit 503 includes a first orientation input terminal, a second orientation input terminal, a first CMOS transmission gate 506, a second CMOS transmission gate 507, a third CMOS transmission gate 508 and a fourth CMOS transmission gate 509. The first orientation input terminal and the second orientation input terminal provide a pair of mutually inverted signals S and ~S. Each CMOS transmission gate includes a first gate and a second gate having different polarities. The first orientation input terminal is electrically connected to a second gate of the first CMOS transmission gate 506, a first gate of the second CMOS transmission gate 507, a second gate of the third CMOS transmission gate 508 and a first gate of the fourth CMOS transmission gate 509. The second orientation input terminal is electrically connected to a first gate of the first CMOS transmission gate 506, a second gate of the second CMOS transmission gate 507, a first gate of the third CMOS transmission gate 508 and a second gate of the fourth CMOS transmission gate 509. An input terminal of the first CMOS transmission gate 506 and an input terminal of the fourth CMOS transmission gate 509 are electrically connected to a signal input terminal 501 of the pair of signal input terminals. An input terminal of the second CMOS transmission gate 507 and an input terminal of the third CMOS transmission gate 508 are electrically connected to another signal input terminal 502 of the pair of signal input terminals. An output terminal of the first CMOS transmission gate 506 and an output terminal of the second CMOS transmission gate 507 are electrically connected to a signal output terminal 504 of the pair of signal output terminals. An output terminal of the third CMOS transmission gate 508 and an output terminal of the fourth CMOS transmission gate 59 are electrically connected to another signal output terminal 505 of the pair of signal output terminals.

The signals S and ~S are respectively a high level signal and a low level signal capable of switching on and off the gates in the CMOS transmission gate. During operation, if the signal S is able to switch on the second gate and switch off the first gate, the signal ~S can switch on the first gate and switch off the second gate.

The signal interchange unit can be created in the form of a plurality of CMOS transmission gates, and it is capable of transmitting digital signals and/or analog signals at a high rate and avoiding voltage loss. Similarly, the signal interchange unit can be implemented using a plurality of transistors.

An embodiment of the invention further provides a method for providing signals to the connector according to the above mentioned embodiments by the socket according to the above mentioned embodiments of the present invention. The method includes: determining an orientation of the connector, and respectively providing signals to the several socket signal contacts based on the orientation of the connector.

The orientation of the connector can be easily and accurately detected by the diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Optionally, the step of determining an orientation of the connector includes: detecting a conductive direction of the two detection contacts to determine an orientation of the connector.

The orientation of the connector can be determined directly and quickly based on the conductive direction of the two detection contacts.

Optionally, the step of respectively providing signals to the several socket signal contacts based on the orientation of the connector includes: when the connector is in a first orientation, providing a pair of predetermined signals to the two socket signal contacts in the corresponding pair of socket signal contacts; when the connector is in a second orientation opposite to the first orientation, providing a pair of interchanged predetermined signals to the two socket signal contacts in the corresponding pair of socket signal contacts.

With the above mentioned arrangement, the socket signal contacts in the socket can provide the correct electrical signals to the respective signal contacts of the connector regardless of whether the connector is inserted into the socket in the first orientation or in the second orientation opposite to the first orientation.

Figure 6:
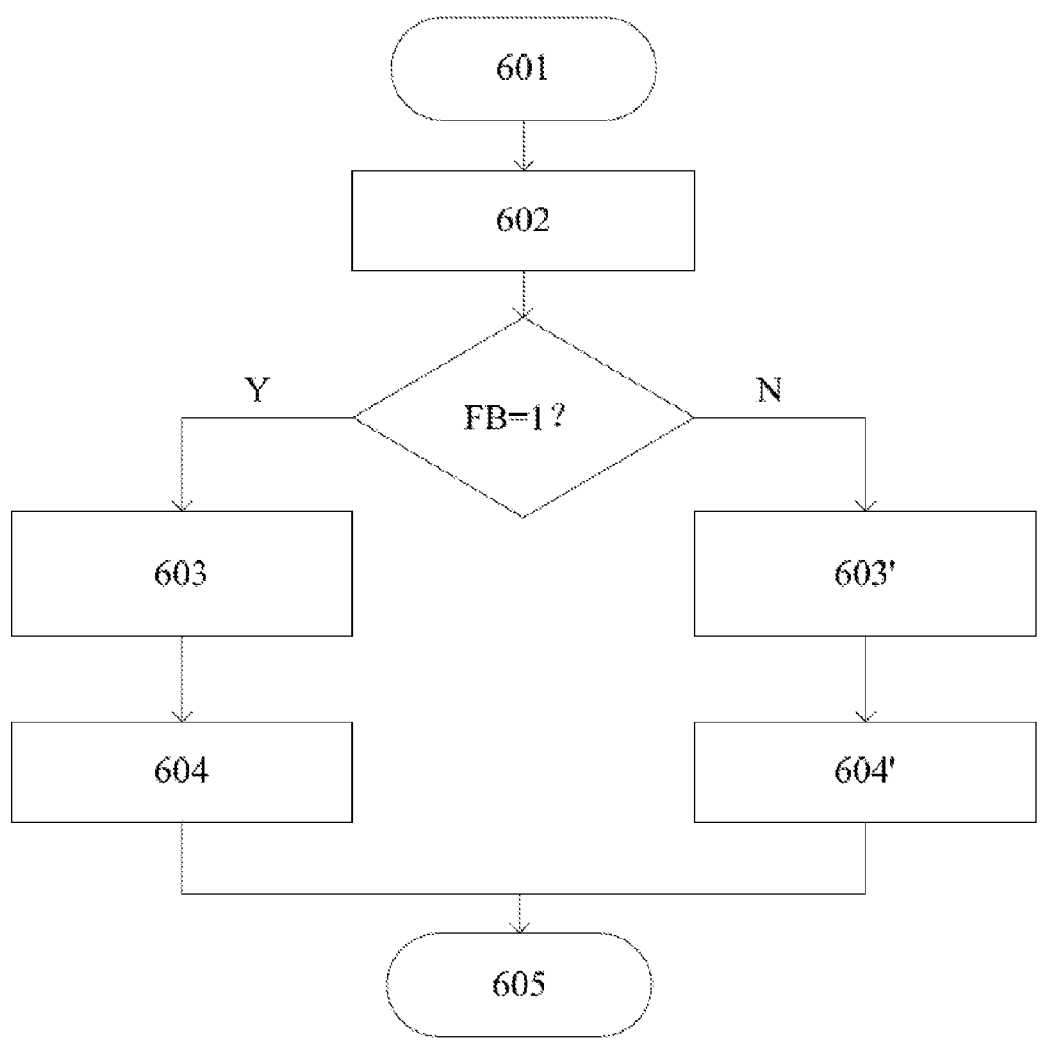
FIG. 6 is a flow chart of a method for providing signals according to an embodiment of the invention.

FIG. 6 is a flow chart of a method for providing signals according to an embodiment of the invention. In this embodiment, the method includes the following steps.

601: powering up.

602: outputting a high level to one of the two detection contacts (e.g., 1021 in FIG. 5) and detecting the potential of another detection contact (e.g., 1022 in FIG. 5). For example, if the potential of the detection contact 1022 is detected to be high (feedback signal FB=1), then the connector is inserted into the socket in a regular orientation. If the potential of the detection contact 1022 is detected to be low (feedback signal FB=0), then the connector is inserted into the socket in a reverse orientation.

603 or 603': based on the value of the feedback signal FB, generating a signal S (high level or low level) and a signal ~S (low level or high level) inverted from the signal S.

604 or 604': through the signals S and ~S, respectively providing signals to the several socket signal contacts (i.e., for regular insertion, the predetermined signals are output to the several socket signal contacts; for reverse insertion, the positions of the predetermined signals are rotated by 180° before the signals are output to the several socket signal contacts).

605: realizing correct transmission for the predetermined signals.

An embodiment of the invention further provides an electronic equipment. The electronic equipment includes the connector according to the above mentioned embodiments and/or the socket according to the above mentioned embodiments of the present invention.

The orientation of the connector can be easily and accurately detected by the diode electrically connected between the two detection contacts. Therefore, with the above mentioned arrangement, when the connector is inserted into the socket in any one of the two opposite orientations, the circuit system is able to provide the correct electrical signals to the respective signal contacts of the connector based on the orientation of the connector, avoiding damage to the circuit.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A connector comprising a main body, the main body having a 180° rotationally symmetrical shape with respect to an axis of the main body, the axis of the main body being parallel to an insertion direction; wherein two detection contacts and several signal contacts are arranged on a surface of the main body; and wherein the two detection contacts are respectively arranged at positions symmetrical with respect to the axis of the main body, and a diode is electrically connected between the two detection contacts.

2. The connector according to claim 1, wherein the several signal contacts comprise a first group of signal contacts arranged with a first spatial distribution and a second group of signal contacts arranged with a second spatial distribution; the first spatial distribution and the second spatial distribution are symmetrical with respect to the axis of the main body to form several pairs of signal contacts; two signal contacts in each pair of signal contacts are symmetrical with respect to the axis of the main body.

3. The connector according to claim 1, wherein the first group of signal contacts and one of the two detection contacts are arranged together in a linear array.

4. The connector according to claim 1, wherein the main body has a shape of cuboid, the first group of signal contacts and the second groups of signal contacts are arranged on two opposite surfaces of the cuboid, the two opposite surfaces are parallel to the axis of the main body.

5. The connector according to claim 1, wherein a shape of the detection contact and the signal contact is a strip shape or a dot shape.

6. A socket adapted to accommodate the connector according to claim 1; the socket comprising a groove having a 180° rotationally symmetrical shape with respect to an axis of the groove, the axis of the groove being parallel to an insertion direction; wherein two socket detection contacts and several socket signal contacts are arranged on a surface of the groove; the positions of two socket detection contacts respectively correspond to the positions of said two detection contacts, and the positions of the several socket signal contacts respectively correspond to the positions of the several signal contacts, thereby forming several pairs of socket signal contacts; two socket signal contacts in each pair of socket signal contacts are symmetrical with respect to the axis of the groove; and wherein one of the socket detection contacts is used for outputting an orientation identification signal and the other of the socket detection contacts is used for detecting the orientation identification signal.

7. The socket according to claim 6, wherein the orientation identification signal is a voltage signal.

8. The socket according to claim 6, wherein the orientation identification signal is a current signal.

9. The socket according to claim 6, further comprising an orientation detection circuit for detecting a conductive direction of the two detection contacts to determine an orientation of the connector.

10. The socket according to claim 6, further comprising several signal regulating circuits;
wherein each signal regulating circuit comprises: a pair of signal input terminals, a signal interchange unit electrically connected to the pair of signal input terminals, and a pair of signal output terminals electrically connected to the signal interchange unit; the two signal output terminals in each pair of signal output terminals are respectively electrically connected to two socket signal contacts in a pair of socket signal contacts;
when the connector is in a first orientation, each pair of signal output terminals provide a pair of predetermined signals to the two socket signal contacts in the corresponding pair of socket signal contacts;
when the connector is in a second orientation opposite to the first orientation, each pair of signal output terminals provide a pair of interchanged predetermined signals to the two socket signal contacts in the corresponding pair of socket signal contacts.

11. The socket according to claim 10, wherein the signal interchange unit determines whether to interchange signals on the two signal output terminals based on the orientation of the connector.

12. The socket according to claim 10, wherein the signal interchange unit comprises a first orientation input terminal, a second orientation input terminal, a first CMOS transmission gate, a second CMOS transmission gate, a third CMOS transmission gate and a fourth CMOS transmission gate; the first orientation input terminal and the second orientation input terminal provide a pair of mutually inverted signals; wherein each CMOS transmission gate comprises a first gate and a second gate having different polarities; the first orientation input terminal is electrically connected to a second gate of the first CMOS transmission gate, a first gate of the second CMOS transmission gate, a second gate of the third CMOS transmission gate and a first gate of the fourth CMOS transmission gate; the second orientation input terminal is electrically connected to a first gate of the first CMOS transmission gate, a second gate of the second CMOS transmission gate, a first gate of the third CMOS transmission gate and a second gate of the fourth CMOS transmission gate; an input terminal of the first CMOS transmission gate and an input terminal of the fourth CMOS transmission gate are electrically connected to a signal input terminal of the pair of signal input terminals; an input terminal of the second CMOS transmission gate and an input terminal of the third CMOS transmission gate are electrically connected to another signal input terminal of the pair of signal input terminals; an output terminal of the first CMOS transmission gate and an output terminal of the second CMOS transmission gate are electrically connected to a signal output terminal of the pair of signal output terminals; an output terminal of the third CMOS transmission gate and an output terminal of the fourth CMOS transmission gate are electrically connected to another signal output terminal of the pair of signal output terminals.

13. A method for providing signals to the connector according to claim 1 by a socket; the socket comprising a groove having a 180° rotationally symmetrical shape with respect to an axis of the groove, the axis of the groove being parallel to an insertion direction; wherein two socket detection contacts and several socket signal contacts are arranged on a surface of the groove; the positions of two socket detection contacts respectively correspond to the positions of said two detection contacts, and the positions of the several socket signal contacts respectively correspond to the positions of the several signal contacts, thereby forming several pairs of socket signal contacts; two socket signal contacts in each pair of socket signal contacts are symmetrical with respect to the axis of the groove; and wherein one of the socket detection contacts is used for outputting an orientation identification signal and the other of the socket detection contacts is used for detecting the orientation identification signal;

wherein the method comprises:
determining an orientation of the connector; and
respectively providing signals to the several socket signal contacts based on the orientation of the connector.

14. The method according to claim 13, wherein the step of determining an orientation of the connector comprises:
detecting a conductive direction of the two detection contacts to determine an orientation of the connector.

15. The method according to claim 13 or 14, wherein the step of respectively providing signals to the several socket signal contacts based on the orientation of the connector comprises:
when the connector is in a first orientation, providing a pair of predetermined signals to the two socket signal contacts in the corresponding pair of socket signal contacts;
when the connector is in a second orientation opposite to the first orientation, providing a pair of interchanged predetermined signals to the two socket signal contacts in the corresponding pair of socket signal contacts.

16. An electronic equipment comprising the connector according to claim 1.

17. The electronic equipment according to claim 16, further comprising a socket; the socket comprising a groove having a 180° rotationally symmetrical shape with respect to an axis of the groove, the axis of the groove being parallel to an insertion direction; wherein two socket detection contacts and several socket signal contacts are arranged on a surface of the groove; the positions of two socket detection contacts respectively correspond to the positions of said two detection contacts, and the positions of the several socket signal contacts respectively correspond to the positions of the several signal contacts, thereby forming several pairs of socket signal contacts; two socket signal contacts in each pair of socket signal contacts are symmetrical with respect to the axis of the groove; and wherein one of the socket detection contacts is used for outputting an orientation identification signal and the other of the socket detection contacts is used for detecting the orientation identification signal.

18. The electronic equipment according to claim 16, wherein the several signal contacts comprise a first group of signal contacts arranged with a first spatial distribution and a second group of signal contacts arranged with a second spatial distribution; the first spatial distribution and the second spatial distribution are symmetrical with respect to the axis of the main body to form several pairs of signal contacts; two signal contacts in each pair of signal contacts are symmetrical with respect to the axis of the main body.

19. The electronic equipment according to claim 16, wherein the socket further comprises several signal regulating circuits;
wherein each signal regulating circuit comprises: a pair of signal input terminals, a signal interchange unit electrically connected to the pair of signal input terminals, and a pair of signal output terminals electrically connected to the signal interchange unit; the two signal output terminals in each pair of signal output terminals are respectively electrically connected to two socket signal contacts in a pair of socket signal contacts;
when the connector is in a first orientation, each pair of signal output terminals provide a pair of predetermined signals to the two socket signal contacts in the corresponding pair of socket signal contacts;
when the connector is in a second orientation opposite to the first orientation, each pair of signal output terminals provide a pair of interchanged predetermined signals to the two socket signal contacts in the corresponding pair of socket signal contacts.

20. The electronic equipment according to claim 19, wherein the signal interchange unit comprises a first orientation input terminal, a second orientation input terminal, a first CMOS transmission gate, a second CMOS transmission gate, a third CMOS transmission gate and a fourth CMOS transmission gate; the first orientation input terminal and the second orientation input terminal provide a pair of mutually inverted signals; wherein each CMOS transmission gate comprises a first gate and a second gate having different polarities; the first orientation input terminal is electrically connected to a second gate of the first CMOS transmission gate, a first gate of the second CMOS transmission gate, a second gate of the third CMOS transmission gate and a first gate of the fourth CMOS transmission gate; the second orientation input terminal is electrically connected to a first gate of the first CMOS transmission gate, a second gate of the second CMOS transmission gate, a first gate of the third CMOS transmission gate and a second gate of the fourth CMOS transmission gate; an input terminal of the first CMOS transmission gate and an input terminal of the fourth CMOS transmission gate are electrically connected to a signal input terminal of the pair of signal input terminals; an input terminal of the second CMOS transmission gate and an input terminal of the third CMOS transmission gate are electrically connected to another signal input terminal of the pair of signal input terminals; an output terminal of the first CMOS transmission gate and an output terminal of the second CMOS transmission gate are electrically connected to a signal output terminal of the pair of signal output terminals; an output terminal of the third CMOS transmission gate and an output terminal of the fourth CMOS transmission gate are electrically connected to another signal output terminal of the pair of signal output terminals.

* * * * *